United States Patent
Ganz

(10) Patent No.: US 8,925,616 B2
(45) Date of Patent: Jan. 6, 2015

(54) SHUTTER FOR CLOSING OPENINGS IN MOTOR VEHICLE INTERIORS, A ROLLER SHUTTER BOX WITH A SHUTTER, A MIDDLE CONSOLE WITH A ROLLER SHUTTER BOX AS WELL AS A METHOD FOR MANUFACTURING A SHUTTER

(75) Inventor: Marco Ganz, Durmersheim (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 8 days.

(21) Appl. No.: 13/514,612

(22) PCT Filed: Dec. 9, 2010

(86) PCT No.: PCT/EP2010/007625
§ 371 (c)(1),
(2), (4) Date: Aug. 17, 2012

(87) PCT Pub. No.: WO2011/069682
PCT Pub. Date: Jun. 16, 2011

(65) Prior Publication Data
US 2012/0305202 A1    Dec. 6, 2012

(30) Foreign Application Priority Data
Dec. 9, 2009  (DE) .......................... 10 2009 057 783

(51) Int. Cl.
*B60R 7/04*       (2006.01)
*B60N 2/46*       (2006.01)
*B60N 3/08*       (2006.01)
*B60R 11/00*      (2006.01)

(52) U.S. Cl.
CPC .......... *B60R 7/04* (2013.01); *B60R 2011/0094* (2013.01); *B60N 2/4686* (2013.01); *B60N 3/08* (2013.01)

USPC ........................................ 160/231.2; 296/37.8

(58) Field of Classification Search
USPC ................... 160/230, 231.1, 231.2; 296/37.8
See application file for complete search history.

(56) References Cited

U.S. PATENT DOCUMENTS

| 2,690,216 | A | * | 9/1954 | Scott ............................. 220/350 |
| 3,870,391 | A | * | 3/1975 | Nims ............................ 312/297 |
| 4,901,436 | A | * | 2/1990 | Gosch et al. ................. 30/43.92 |
| 5,065,808 | A | * | 11/1991 | Hopperdietzel ........... 160/231.2 |
| 6,499,785 | B2 | * | 12/2002 | Eguchi ......................... 296/37.8 |

(Continued)

FOREIGN PATENT DOCUMENTS

| EP | 1690740 | 8/2006 |
| EP | 1724155 | 11/2006 |
| GB | 2424390 | 9/2006 |

OTHER PUBLICATIONS

International Search Report for PCT/EP2010/007625, Mar. 17, 2011, 3 pages (translated).

(Continued)

*Primary Examiner* — David Purol
(74) *Attorney, Agent, or Firm* — Reising Ethington P.C.

(57) ABSTRACT

The invention relates to a shutter for closing openings in motor vehicle interiors, having a decorative layer and a support arrangement; the invention also relates to a roller shutter box, to a centre console, and to a method for producing a shutter. Because the support arrangement comprises at least one one-piece support forming a plurality of roller shutter rods, additional expense for connecting the roller shutter rods is unnecessary.

17 Claims, 3 Drawing Sheets

(56) References Cited

U.S. PATENT DOCUMENTS

Figure 1:
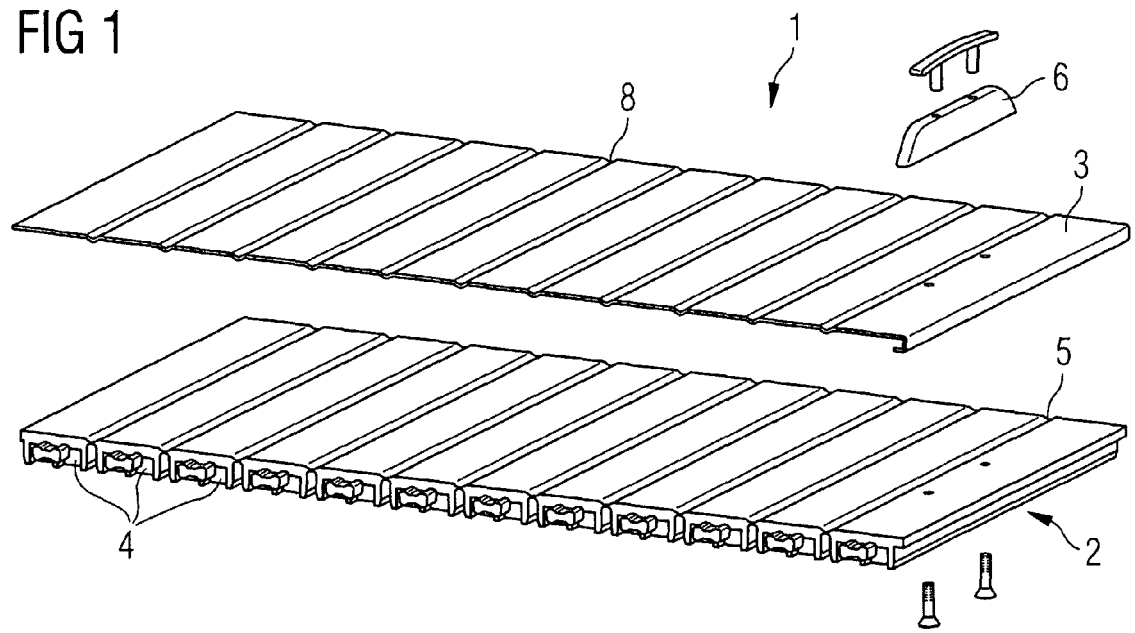

| | | | |
|---|---|---|---|
| 6,672,554 B2* | 1/2004 | Fukuo | 248/311.2 |
| 6,883,852 B2* | 4/2005 | Laskey | 296/37.8 |
| 7,475,954 B1* | 1/2009 | Latunski | 312/297 |
| 7,581,773 B2* | 9/2009 | Strasser et al. | 296/1.09 |
| 7,588,280 B2* | 9/2009 | Dobos et al. | 296/37.12 |
| 7,954,871 B2* | 6/2011 | Hipshier | 296/24.34 |
| 2003/0218274 A1 | 11/2003 | Boutilier et al. | |
| 2006/0037713 A1* | 2/2006 | Ichimaru et al. | 160/37 |
| 2007/0102463 A1* | 5/2007 | Thomas | 224/275 |
| 2008/0084083 A1 | 4/2008 | Boddie et al. | |

OTHER PUBLICATIONS

Written Opinion for PCT/EP2010/007625, Mar. 17, 2011, 6 pages (in German only).

* cited by examiner

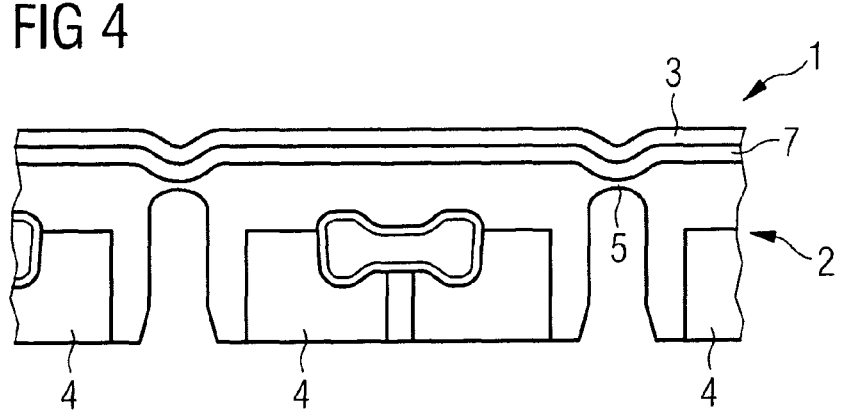
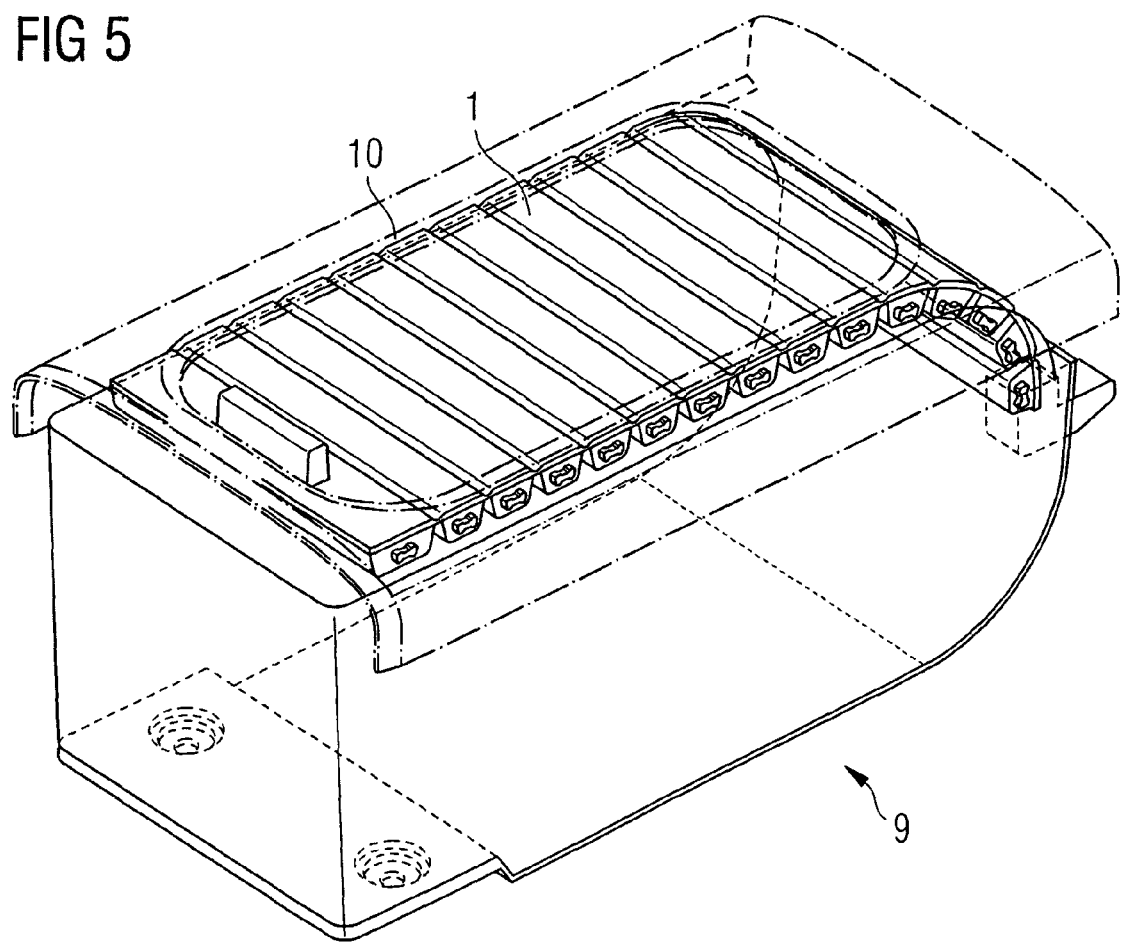

SHUTTER FOR CLOSING OPENINGS IN MOTOR VEHICLE INTERIORS, A ROLLER SHUTTER BOX WITH A SHUTTER, A MIDDLE CONSOLE WITH A ROLLER SHUTTER BOX AS WELL AS A METHOD FOR MANUFACTURING A SHUTTER

TECHNICAL FIELD

The invention relates to a shutter for closing openings, for example of roller shutter boxes of middle consoles in motor vehicles, to a roller shutter box, to a middle console, as well as to a method for manufacturing such a shutter.

BACKGROUND

Different possibilities for the design of shutters for closing roller shutter boxes, for example in the middle consoles in vehicles, are known from the state of the art.

It is known from DE 4010241, to manufacture such a shutter from a multitude of roller shutter rods. These are each individually coated with decorative veneer as well as optionally with a protective layer. The roller shutter rods are articulately connected to their adjacent rods in each case by way of intermediate pieces. This arrangement has the disadvantage that the manufacture is relatively complicated due to the individual attachments of the veneers, as well as on account of the necessity of the multitude of individual intermediate pieces. Moreover, such a shutter has the disadvantage that it has no continuous surface since it is lowered at the connection locations in each case between two roller shutter rods. A cleaning of the roller shutter is rendered more difficult by way of this.

Moreover, shutters are known for example from EP 1 690 740 A1, which consist of individual slats which are connected by an intermediate layer. A decor is applied onto the intermediate layer. Such shutters are easier to clean for the user, but the manufacture is still quite expensive.

SUMMARY

It is therefore the object of the invention to provide a shutter which can be less expensively manufactured, with at least the same quality. A further object lies in providing a simplified method for manufacturing shutters.

These objects are achieved by a shutter according to claim 1, a roller shutter box according to claim 9, a middle console according to claim 12 as well as a method according to claim 13. Advantageous further developments and improvements are possible by way of the measures specified in the dependent claims.

Due to the fact that the support arrangement comprises at least one single-piece carrier (support) forming a plurality of roller shutter rods, the roller shutter rods are already connected due to the fact that they are formed by the single-piece carrier, so that an additional connection of these roller shutter rods amongst one another is not necessary. Roller shutter rods are hereby to be understood as any rod-like or slat-like objects for forming a shutter or a roller shutter.

The term "single-piece" is to be understood in that the carrier is manufactured as one piece. A plurality of roller shutter rods which are connected to one another by an adhesive layer would thus not form a single-piece carrier in the context of the invention.

Advantageously, at least some of the roller shutter rods are articulately connected to one another. A flexural rigidity in the bending direction of the articulated connection is advantageously minimal in the each case centrally between the two roller shutter rods, i.e. preferably in the middle of the articulated connection. The flexural rigidity in the direction orthogonal to the bending direction of the articulated connection is advantageously at least one and particularly advantageously at least two or three orders of magnitude larger than the minimal flexural rigidity in the bending direction of the articulated connection and is advantageously adequately large, in order to avoid an excessive sagging even with a loading with a force of at least 800 N.

In a particularly advantageous embodiment, the articulated connections are designed as film hinges. The film hinges are advantageously formed tapering in the hinge direction to their middle. A length of the film hinges advantageously is between 1 mm and 4 mm, particularly advantageously between 2 mm and 3 mm and in particular 2.5 mm. The thickness at the thinnest location of the film hinge is advantageously between 0.1 mm and 1 mm, particularly advantageously between 0.2 mm and 0.6 mm and in particular 0.4 mm.

Particularly advantageously, the carrier arrangement is designed as a single, one-piece carrier. No additional connections whatsoever are required any more between the roller shutter rods or different carriers on account of this. Advantageously, the carrier has a width between 50 mm and 300 mm, particularly advantageously between 80 mm and 200 mm, and in particular of 120 mm, and a length between 100 mm and 500 mm, particularly advantageously between 200 mm and 400 mm and in particular of 300 mm. The individual roller shutter rods particularly advantageously have a width between 5 mm and 25 mm and particularly advantageously between 10 mm and 15 mm.

The carrier can be designed in a particularly simple manner as injection moulded carriers. This in particularly advantageous with the flexible connection of the roller shutter rods by film hinges, since thus a flexible connection of the roller shutter rods is possible without additional effort.

In a preferred embodiment, the carrier consists of a polymer, which in particular can be thermoplastic. The design of the carrier of such a polymer is advantageous, since such a carrier is particularly simple to machine and process. For example POM or PA6 are ideally suitable as a material for forming the carrier. The material advantageously has a hardness degree of at the most 95, particularly advantageously 85 and in particularly of at the most of 80 Shore L. At the same time, the hardness degree advantageously is at least 5, particularly advantageously at least 50 and very particularly advantageously at least 75 Shore L. Any hardness degree ranges which are encompassed by any combinations of the previously mentioned maximal and minimal values can be considered as advantageous, wherein the range between 76 and 80 Shore L is particularly advantageous. The selection of the hardness degree in combination with the shaping of the carrier design is decisive for the characteristics of the shutter. A low hardness degree leads to pleasantly soft haptics and to an increased flexibility of the articulated connections. However, if the degree of hardness is selected too small, then this leads to a stiffness which is too low in the direction of the roller shutter rods and thus to a disadvantageous sagging. Although this can be counteracted by a thicker design of the carrier, however this increases the material costs as well as the spatial requirement of the shutter.

It is advantageous to attach the decor layer directly onto the carrier, i.e. without an intermediate layer, since this particularly simplifies the manufacture. Alternatively however, an intermediate layer can also be advantageous for example for influencing the haptics characteristics, e.g. by cushioning.

The manufacture is simplified compared to the state of the art also with the use of such an intermediate layer, to which basically also separate roller shutter rods can be connected. With the use of separate roller shutter rods, on attaching a layer simultaneously serving for the connection and improvement of the haptics characteristics, these roller shutter rods must be fixed individually in a manner requiring quite some effort, whereas with the use of at least one single-piece carrier containing several roller shutter rods, an individual fixation of the roller shutter rods is not necessary.

The decor layer can for example consist of leather, artificial leather, a fabric or another textile. A thickness of the decor layer is advantageously between 0 3 mm and 2 mm, particularly advantageously between 0.5 mm and 1.2 mm and in particular 0.8 mm. A hardness degree of the decor layer is advantageously between 25 and 85, particularly advantageously between 45 and 65 and in particular 55 Shore A.

Advantageously, a decorative element can be attached onto the decor layer or can be incorporated into the decor layer. For example an embossing, a print or a decorative seam can serve as a decorative element.

The invention further relates to a roller shutter box with a storage compartment and with a shutter as previously described, wherein the shutter is arranged for closing the storage compartment.

Advantageously, the roller shutter box comprises at least two guide rails which are arranged for guiding the roller shutter. Advantageously, the ends of the roller shutter rods as well as the guide rails are designed in a manner such that the shutter cannot slide laterally out of the guide rail even in the case of a sagging, for example by way of a heavy weight placed on the shutter. Advantageously, the guide rails as well as the ends of the roller shutter rods are designed in a manner such that in the case of a loading leading to an excessive sagging, a part of a force causing the sagging is accommodated by the guide rail.

In a particularly advantageous embodiment, the guide rails comprise two limbs which are arranged at an angle and advantageously at right angles to one another. These limbs can be connected to one another with a material fit, so that the guide rail is of one piece. Alternatively, the guide rail can however also be formed from several separate rails. On account of the angled design of the guide rails, the shutter, when being opened, can be displaced partly into a region which is not visible to the user, such as into a hollow outer wall of the roller shutter box for example.

Moreover, the invention relates to a middle console as well as to a previously described roller shutter box.

Moreover, the invention relates to a method for manufacturing a shutter which comprises the steps of manufacturing a carrier arrangement with at least one single-piece carrier forming a plurality of roller shutter rods, and applying a decor layer onto the carrier arrangement The decor layer can be applied onto the carrier arrangement in a particularly simple manner by way of bonding. The carrier can in particular be manufactured by way of injection moulding.

Advantageously, the decor layer with the method is cut into a desired shape. Moreover, it is advantageous as an additional step to apply decorative elements onto the decor layer. Moreover, it is advantageous to apply adhesive onto the carrier.

In a particularly advantageous embodiment, the cutting to shape of the decor layer, the application of decorative elements onto the decor layer and/or the application of adhesive onto the carrier is carried out parallel to one of the other steps.

BREIF DESCRIPTION OF THE DRAWINGS

Figure 2:
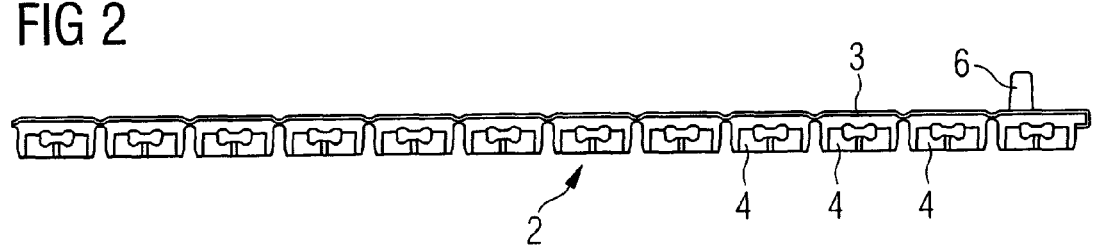
Figure 3:
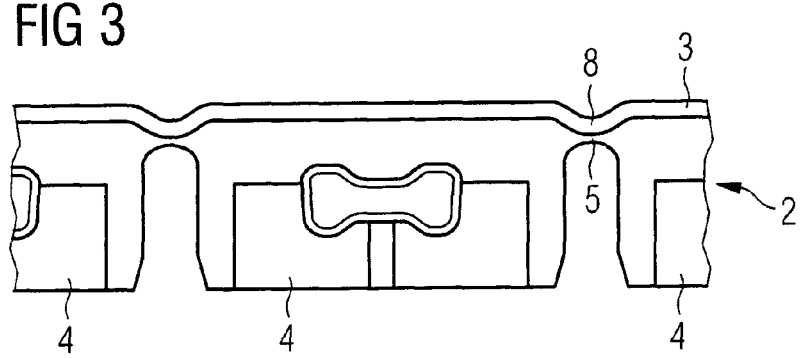

Embodiment examples of the invention are explained in more detail in the subsequent drawings and are explained in more detail in the subsequent description. In the drawings:

FIG. 1 is a exploded representation of an embodiment example of a shutter according to the invention, FIG. 2 is an lateral view of the shutter of FIG. 1, FIG. 3 is a detailed view of the shutter of FIG. 1

Figure 6:
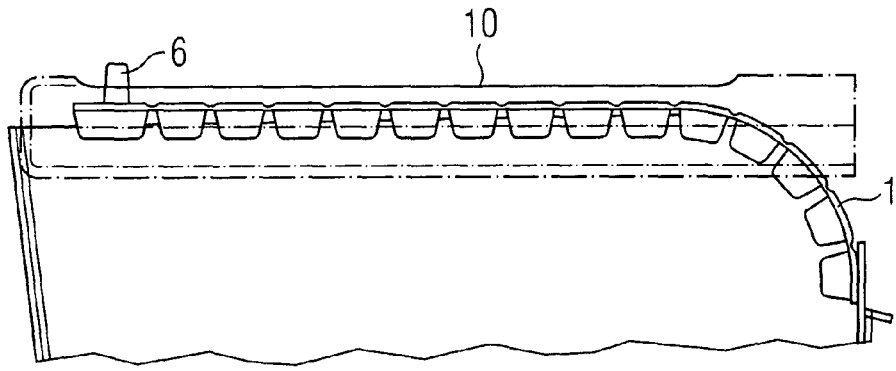
Figure 7:
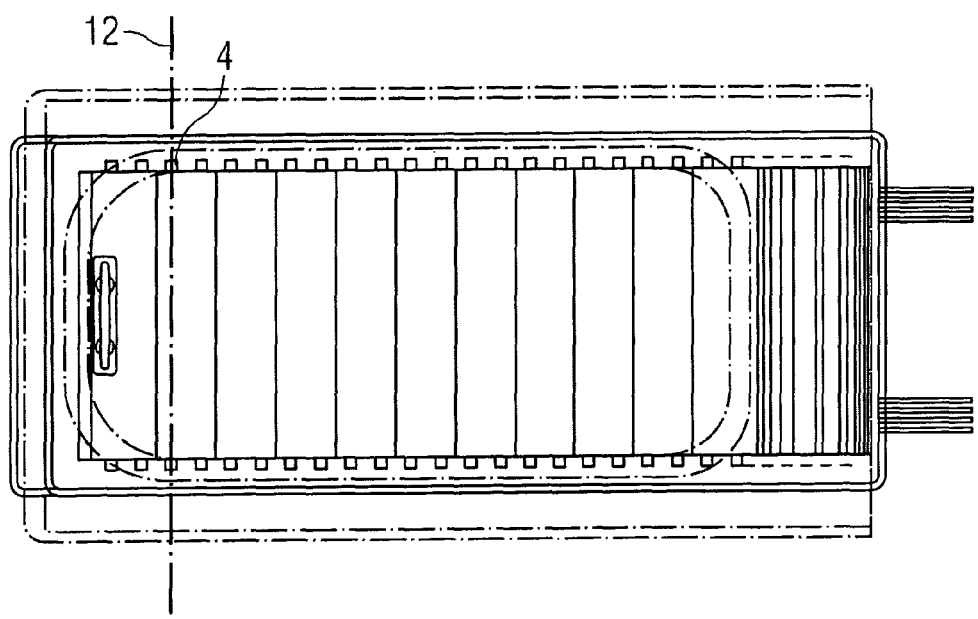
Figure 8:
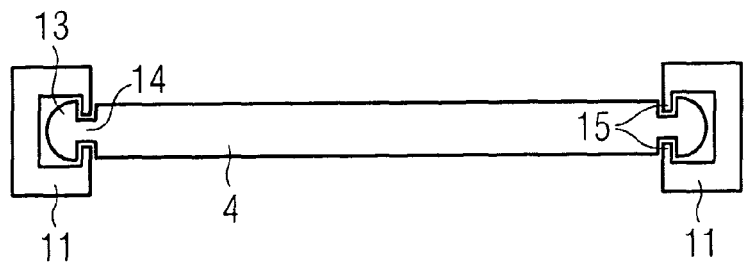

FIG. 4 is a detailed view of a second embodiment of a shutter according to the invention, FIG. 5 is an oblique view of a roller shutter box according to the invention which is designed as a middle console, FIG. 6 is a sectioned view of the roller shutter box of FIG. 6, FIG. 7 is a plan view of the roller shutter box of FIG. 6 and FIG. 8 is a section along the roller shutter rod through the roller shutter box of FIG. 6.

DETAILED DESCRIPTION OF THE ILLUSTRATED EMBODIMENT(S)

A shutter 1 is shown in an exploded representation in FIG. 1. The shutter 1 consists of a carrier 2 as well as a decor layer 3. The carrier 2, in the represented embodiment example has a length of 300 mm and a width of 120 mm, is designed as one piece and consists of a multitude of roller shutter rods 4. The roller shutter rods in this embodiment example have a width of 12 mm and, as is best to be deduced from FIG. 3, are flexibly connected by way of film hinges 5. The film hinges are about 0.4 mm thick at the thinnest location and about 2 mm to 3 mm long.

The carrier 2 can for example consist of thermoplastic POM and was manufactured in a one-part manner by way of an injection moulding method in one method step. In the present embodiment example, the carrier has a hardness degree of 76 Shore L. The complete flexural rigidly of the shutter in the bending direction of the film hinges 5 is adequately small, in order to permit a simple bending of the shutter, for example for displacing the shutter in a bent guide rail. The flexural rigidity of the film hinges themselves is lower than the average flexural rigidity in the bending direction and is minimal in the middle of the film hinges 5. The flexural rigidity orthogonally to the bending direction of the film hinges 5 is more than one order of magnitude larger than the flexural rigidity in the bending direction of the hinges. In the embodiment example represented in the FIGS. 1 to 3, the decor layer 3 is applied directly onto the carrier. The decor layer 3 consists of leather and is provided with quilted decorative seams 8 as well as with an embossing which is not shown. An operating element 6 for pulling the shutter open and closed is screwed to the carrier through the decor layer 3.

The shutter 1 was manufactured by way of the carrier 2 firstly being produced in an injection moulding method and the decor layer 3 being cut to shape. Adhesive was subsequently deposited onto the carrier 2. The carrier 2 and the decor material 3 were then brought into a laminating tool with which the decor layer 3 was pressed onto the carrier 2. For this, a laminating tool with a structured surface was used, by way of which surface an embossing was simultaneously introduced into the decor material. The operating element 6 was attached after the removal of the shutter from the laminating tool.

The embodiment example in FIG. 4 differs from the previously described example merely by way of a soft intermediate layer 7 being arranged between the carrier and the decor layer. Artificial leather was used instead of leather.

A roller shutter box 9 according to the invention, which is designed as a middle console, is represented in FIG. 5. The roller shutter box 9 comprises an opening 10. This is closed by the shutter 1.

A longitudinal section through the roller shutter box 7 is shown in FIG. 6, wherein a few details have been omitted for the purpose of a better overview. The shutter 1 covers the opening 8 and in each case in a plane lying in front of and behind the picture plane, is guided in a rail which is not visible in this section plane. The rail sets the course of the shutter 1. For this, the rail has an angled shape corresponding to the represented arrangement of the shutter, with a rounded corner. A section along and through a roller shutter rod and thus transversely through the guiding rails 11 along the section line 12 which is shown in FIG. 7, is shown in FIG. 8.

As is to be recognised, the roller shutter rods 4 in the represented embodiment example on both sides comprise a rounded end 13 and a tapering 14 arranged in front of one end. The rails 11 are shaped in a manner such that on both sides of the roller shutter rod, an edge 15 of the rails 9 engages into the tapering 14. By way of this, in the case of an excessive force loading from the top, one prevents the roller shutter rod 4 from sagging in a manner such that one or both its ends 13 slide out of the rail 11. Instead of this, the rail 11 accommodates the force with such a loading. Since the rail is only loadable to a certain extent in this direction, it is advantageous for the carrier which contains the roller shutter rod, to have an adequately large flexural rigidity in a direction orthogonal to the hinge direction of the film hinges 5, so that an excessive sagging, thus a sagging which would lead to a lateral loading of the guide rails, is avoided, at least with a loading by a force of up to 800 N from above onto the shutter of the roller shutter box.

By way of this, the rails are usually only loaded by a force directed downwards, so that the edges 15 most are loaded very little to a negligible extent.

With an adequate flexural rigidity, in the direction orthogonal to the hinge direction, it can be advantageous to design the roller shutter rods without a tapering 14 and to omit the edge 15 of the rail, since such rails and shutters are simpler to produce.

The invention claimed is:

1. A shutter for the displaceable closure of openings in motor vehicle interiors with a decor layer and with a carrier arrangement, characterized in that the carrier arrangement comprises at least one single-piece carrier, each carrier being a single-piece molding that includes a plurality of roller shutter rods and a film hinge connecting each roller shutter rod to another roller shutter rod, wherein each roller shutter rod includes ends configured to engage guide rails of a roller shutter box, and wherein the material of the carrier arrangement consists of a polymer with a hardness degree of between 5 and 95 Shore L whereby each roller shutter rod, including each end of each roller shutter rod, and each hinge of each carrier is formed from the same material as a single piece of said polymer and wherein the decor layer has a hardness degree between 25 and 85 Shore A.

2. A shutter according to claim 1, characterized in that the carrier arrangement is the at least one single-piece carrier.

3. A shutter according to claim 1, characterized in that the carrier arrangement is at least one injection molded carrier.

4. A shutter according to claim 1, characterized in that polymer of the carrier arrangement has a hardness degree of between 50 and 85.

5. A shutter according to claim 1, characterized in that the decor layer is applied directly onto the carrier arrangement.

6. A shutter according to claim 1, characterized in that the decor layer at least partly consists of at least one of leather, artificial leather, fabric, or a textile.

7. A shutter according to claim 1, characterized in that the decor layer contains at least one decorative element or that at least one decorative element is applied onto the decor layer, wherein the decorative element is at least one of a decorative seam, an embossing, or a print.

8. A roller shutter box for a middle console in motor vehicles, containing at least one storage compartment and at least one shutter according to claim 1, wherein the shutter is adapted to and arranged for the closure of the storage compartment.

9. A roller shutter box according to claim 8, characterized in that the roller shutter box contains at least two guide rails for guiding the roller shutter.

10. A roller shutter box according to claim 9, characterized in that the guide rails are angled guide rails, wherein an angle between a first limb and a second limb of the guide rails is between 70° and 110°.

11. A middle console with a roller shutter box according to claim 1.

12. A method for manufacturing a shutter comprising the steps:
    manufacturing a carrier arrangement with at least one single-piece carrier by molding each carrier as a single piece of polymer, each carrier having a plurality of roller shutter rods and a hinge connecting each roller shutter rod to another roller shutter rod, wherein each roller shutter rod includes ends configured to engage guide rails of a roller shutter box, wherein said polymer has a hardness degree between 5 and 95 Shore L; and
    applying a decor layer with a hardness degree between 25 and 85 Shore A onto the carrier arrangement.

13. A method according to claim 12, characterized in that the decor layer is applied by way of bonding.

14. A method according to claim 12, characterized in that the decor layer is cut into the desired shape.

15. A method according to claim 12, characterized in that the decor layer is provided with decorative elements.

16. A method according to claim 12, characterized in that adhesive is applied onto the carrier.

17. A method according to claim 12, characterized in that at least one of the additional steps of:
    cutting the decor layer to size, applying decorative elements onto the decor layer, or applying adhesive onto the carrier
    is carried out parallel to one of the other steps.

* * * * *